(12) United States Patent
Kojima

(10) Patent No.: US 11,846,541 B2
(45) Date of Patent: Dec. 19, 2023

(54) OPTICAL FIBER SENSING SYSTEM WITH IMPROVED STATE DETECTION

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 207 days.

(21) Appl. No.: 17/427,217

(22) PCT Filed: Jan. 31, 2019

(86) PCT No.: PCT/JP2019/003387
§ 371 (c)(1),
(2) Date: Jul. 30, 2021

(87) PCT Pub. No.: WO2020/157917
PCT Pub. Date: Aug. 6, 2020

(65) Prior Publication Data
US 2022/0146303 A1    May 12, 2022

(51) Int. Cl.
*G01H 9/00* (2006.01)
*G01V 1/00* (2006.01)

(52) U.S. Cl.
CPC ............. *G01H 9/004* (2013.01); *G01V 1/001* (2013.01)

(58) Field of Classification Search
None
See application file for complete search history.

(56) References Cited

U.S. PATENT DOCUMENTS

| 9,000,918 | B1* | 4/2015 | McLaughlin | G08B 13/12 340/541 |
| 2006/0197665 | A1* | 9/2006 | Shibata | G08B 13/186 398/21 |
| 2012/0230629 | A1 | 9/2012 | Hill et al. | |
| 2013/0139600 | A1 | 6/2013 | McEwen-King et al. | |
| 2013/0188176 | A1* | 7/2013 | Lovely | G01D 5/353 356/73.1 |

(Continued)

FOREIGN PATENT DOCUMENTS

| CN | 202325687 | * | 7/2012 |
| CN | 202325687 U | | 7/2012 |
| CN | 103824406 | * | 5/2014 |

(Continued)

OTHER PUBLICATIONS

International Search Report for PCT Application No. PCT/JP2019/003387, dated Mar. 19, 2019.

(Continued)

*Primary Examiner* — Brandi N Hopkins
*Assistant Examiner* — Nigel H Plumb
(74) *Attorney, Agent, or Firm* — Sughrue Mion, PLLC

(57) ABSTRACT

An optical fiber sensing system with improved state detection includes: a cable including optical fibers; a reception unit configured to receive an optical signal from at least one optical fiber included in the cable and acquire a first parameter and a second parameter having a pattern in accordance with a state of a target to be monitored based on the optical signal; and a state detection unit configured to detect a predetermined event based on the pattern that the first parameter has and then detect the state of the target to be monitored based on the pattern that the second parameter has.

8 Claims, 12 Drawing Sheets

(56) References Cited

U.S. PATENT DOCUMENTS

2017/0003177 A1    1/2017  Cedilnik et al.
2018/0267201 A1*   9/2018  Lewis .................... B61L 1/166

FOREIGN PATENT DOCUMENTS

| CN | 103824406 A  | 5/2014  |
|----|--------------|---------|
| CN | 107917738 A  | 4/2018  |
| CN | 207197660 U  | 4/2018  |
| CN | 108287017 A  | 7/2018  |
| JP | 2006208061 A | 8/2006  |
| JP | 2013253831 A | 12/2013 |
| JP | 2018504603 A | 2/2018  |

OTHER PUBLICATIONS

Office Action dated Apr. 4, 2023 in Japanese Application No. 2020-569279.

\* cited by examiner

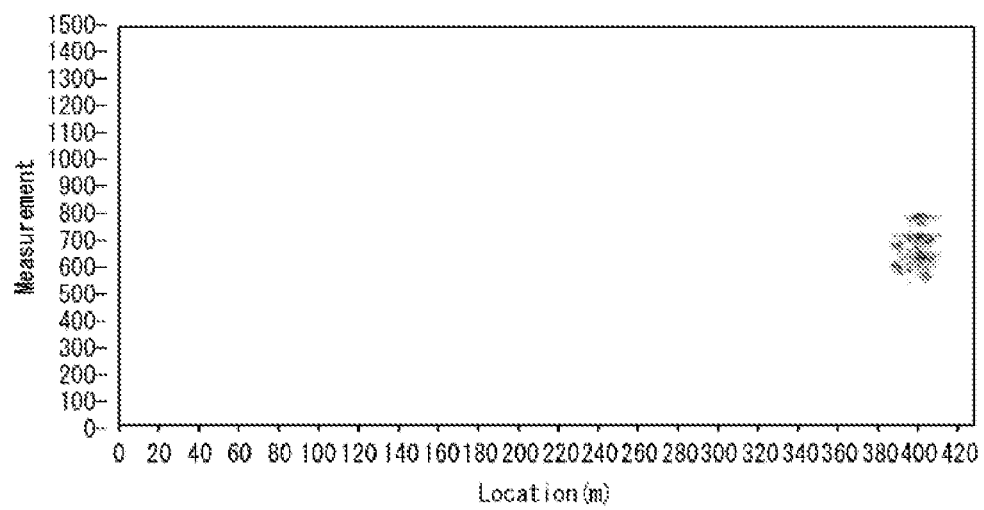
Fig. 2
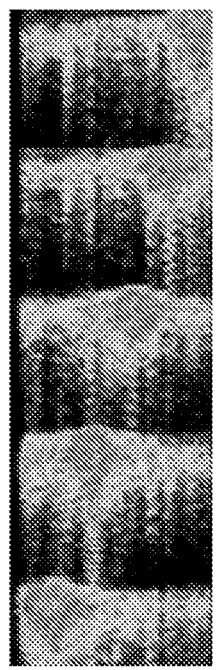
Fig. 3A
Fig. 3B
Fig. 3C
Fig. 3D
Fig. 3E

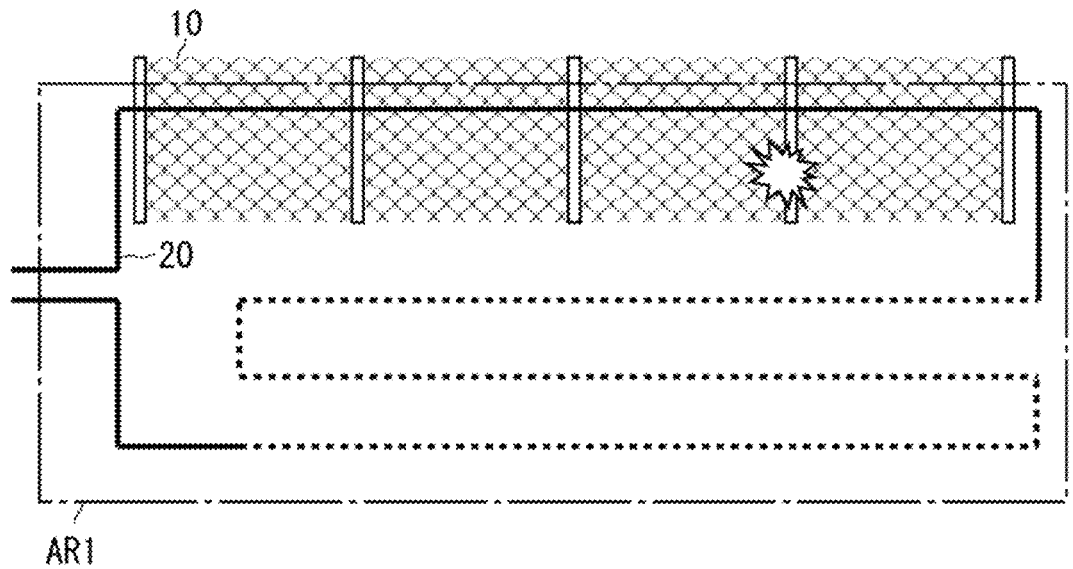
NARROW DOWN AREA
FROM AR1 TO AR2
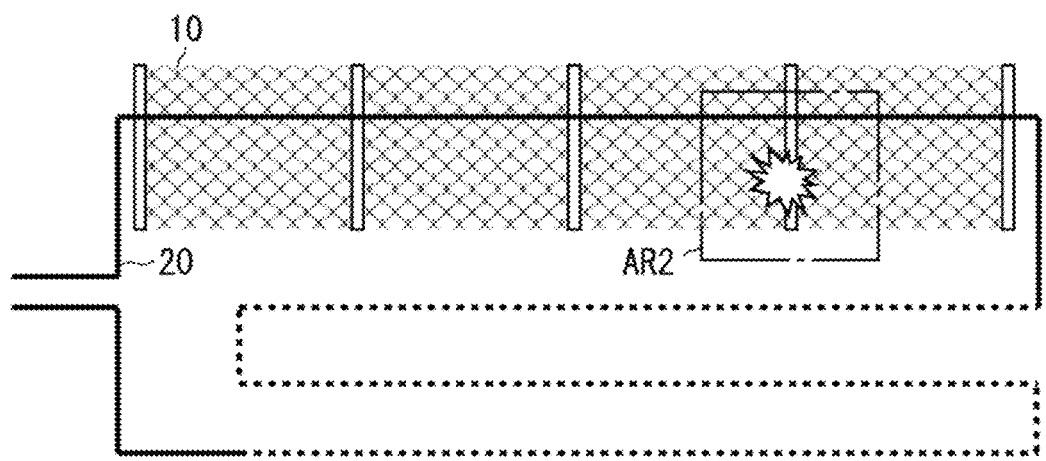
Fig. 9

OPTICAL FIBER SENSING SYSTEM WITH IMPROVED STATE DETECTION

This application is a National Stage Entry of PCT/JP2019/003387 filed on Jan. 31, 2019, the contents of all of which are incorporated herein by reference, in their entirety.

TECHNICAL FIELD

The present disclosure relates to an optical fiber sensing system, a state detection apparatus, a state detection method, and a computer readable medium.

BACKGROUND ART

In recent years, a system for monitoring states of targets to be monitored (mainly, persons) who are in a fence and in the vicinity of the fence using optical fibers has been proposed (e.g., Patent Literature 1). According to the technique disclosed in Patent Literature 1, optical fibers are laid down in a fence, and vibrations generated in the fence due to an intruder climbing or using a ladder to climb the fence are detected.

CITATION LIST

Patent Literature

[Patent Literature 1] Japanese Unexamined Patent Application Publication No. 2006-208061

SUMMARY OF INVENTION

Technical Problem

However, the technique disclosed in Patent Literature 1 is configured to determine the states of the targets to be monitored who are in the fence and in the vicinity of the fence based on a rough reference such as the magnitude of vibrations. With this configuration, only a simple state can be detected.

On the other hand, it is expected that pattern sensing that uses dynamic patterns of optical fiber sensing will be performed in the future as a technique for detecting the state of the target to be monitored in more detail.

Vibration data that can be detected by optical fiber sensing has unique patterns according to the state of the target to be monitored. It is possible to specify the state of the target to be monitored by analyzing the dynamic change of these patterns.

Further, in the optical fiber sensing, it is possible to detect not only vibrations but also a sound or temperature. It is expected that high-level state detection will be performed using these characteristics.

An object of the present disclosure is to provide an optical fiber sensing system, a state detection apparatus, a state detection method, and a computer readable medium capable of solving the aforementioned problems and performing higher-level detection of the state of the target to be monitored in a more flexible way.

Solution to Problem

An optical fiber sensing system according to one aspect includes:
a cable including optical fibers;
a reception unit configured to receive an optical signal from at least one optical fiber included in the cable and acquire a first parameter and a second parameter having a pattern in accordance with a state of a target to be monitored based on the optical signal; and
a state detection unit configured to detect a predetermined event based on the pattern that the first parameter has and then detect the state of the target to be monitored based on the pattern that the second parameter has.

A state detection apparatus according to one aspect includes:
a reception unit configured to receive an optical signal from at least one optical fiber included in a cable and acquire a first parameter and a second parameter having a pattern in accordance with a state of a target to be monitored based on the optical signal; and
a state detection unit configured to detect a predetermined event based on the pattern that the first parameter has and then detect the state of the target to be monitored based on the pattern that the second parameter has.

A state detection method according to one aspect includes:
receiving an optical signal from at least one optical fiber included in a cable and acquiring a first parameter and a second parameter having a pattern in accordance with a state of a target to be monitored based on the optical signal; and
detecting a predetermined event based on the pattern that the first parameter has and then detecting the state of the target to be monitored based on the pattern that the second parameter has.

A non-transitory computer readable medium according to one aspect stores a program for causing a computer to execute the following procedures of:
receiving an optical signal from at least one optical fiber included in a cable and acquiring a first parameter and a second parameter having a pattern in accordance with a state of a target to be monitored based on the optical signal; and
detecting a predetermined event based on the pattern that the first parameter has and then detecting the state of the target to be monitored based on the pattern that the second parameter has.

Advantageous Effects of Invention

According to the aforementioned aspects, it is possible to obtain an effect that an optical fiber sensing system, a state detection apparatus, a state detection method, and a computer readable medium capable of performing higher-level detection of the state of the target to be monitored in a more flexible way can be provided.

BRIEF DESCRIPTION OF DRAWINGS

FIG. 2 is a diagram showing an example of vibration data acquired by an optical fiber detection unit according to the first embodiment;

FIGS. 3A, 3B, 3C, 3D and 3E are diagrams showing an example in which the vibration data acquired by the optical fiber detection unit according to the first embodiment is arranged in time series;

FIG. 9 is a diagram showing an example in which an area to be sensed is narrowed down in the state detection unit according to the first embodiment;

DESCRIPTION OF EMBODIMENTS

Hereinafter, with reference to the drawings, embodiments of the present disclosure will be explained.

First Embodiment

<Configuration of First Embodiment>

Figure 1:
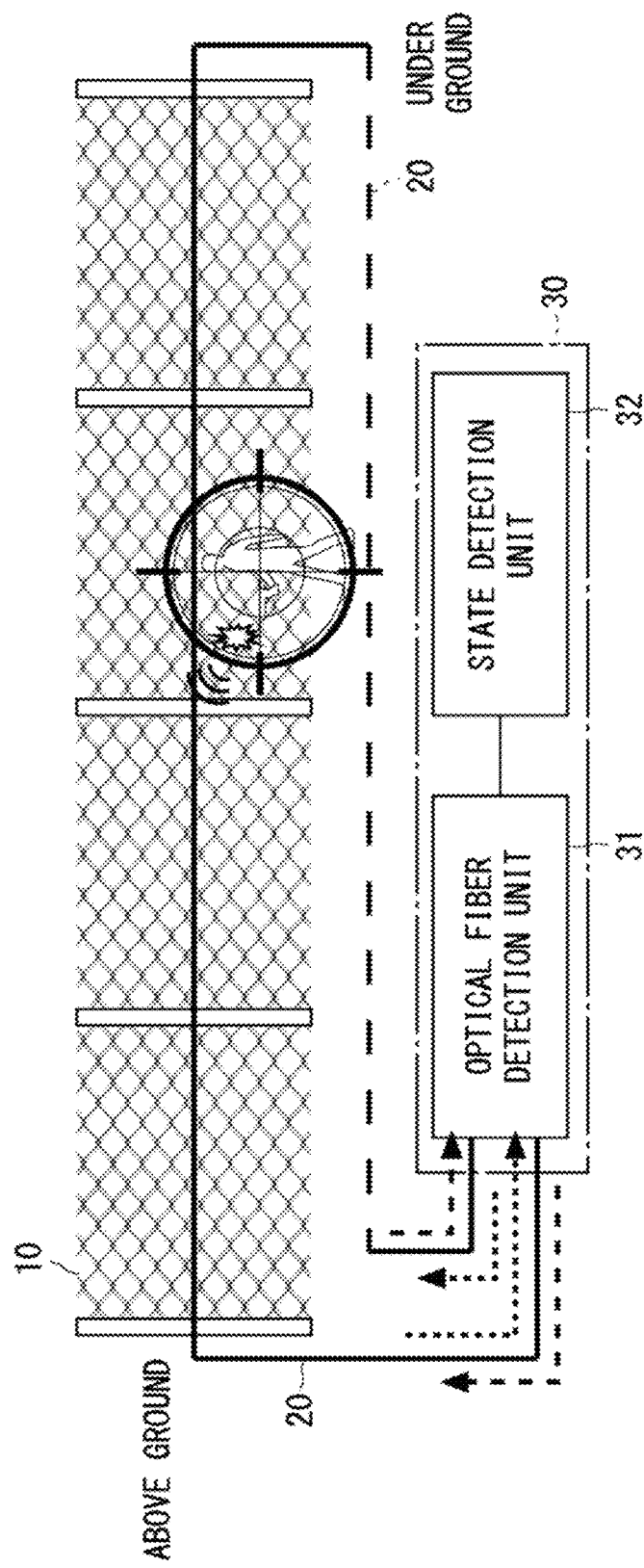
FIG. 1 is a diagram showing a configuration example of an optical fiber sensing system according to a first embodiment.

Referring first to FIG. 1, a configuration of an optical fiber sensing system according to a first embodiment will be explained. While the targets to be monitored are described as being persons who are in a fence 10 and in the vicinity thereof in the first embodiment, the target to be monitored is not limited thereto.

As shown in FIG. 1, the optical fiber sensing system according to the first embodiment, which detects states of the targets to be monitored who are in the fence 10 and in the vicinity thereof, includes an optical fiber cable 20 and a state detection apparatus 30. Further, the state detection apparatus 30 includes an optical fiber detection unit 31 and a state detection unit 32. Further, the optical fiber detection unit 31 is one example of a reception unit.

The optical fiber cable 20, which is a cable configured to coat one or more optical fibers, is laid continuously in the fence 10 above the ground, and in the ground in the vicinity of the fence 10, and the respective ends of the optical fiber cable 20 are connected to the optical fiber detection unit 31. In FIG. 1, the part of the optical fiber cable 20 laid above the ground is shown by a solid line and the part of the optical fiber cable 20 laid in the ground is shown by a dotted line. However, the method of laying the optical fiber cable 20 shown in FIG. 1 is merely one example, and it is not limited thereto.

The optical fiber detection unit 31 emits a pulsed light to at least one optical fiber included in the optical fiber cable 20. Further, the optical fiber detection unit 31 receives a reflected light or a scattered light generated while the pulsed light is being transmitted through the optical fiber as a return light via the same optical fiber. In FIG. 1, the optical fiber detection unit 31 emits the pulsed light in the clockwise direction and receives the return light with respect to this pulsed light from the clockwise direction. At the same time, the optical fiber detection unit 31 emits a pulsed light in the counterclockwise direction and receives a return light with respect to this pulsed light from the counterclockwise direction. That is, the optical fiber detection unit 31 receives the return light from two directions.

When a vibration occurs in the fence 10 and in the vicinity thereof, this vibration is superimposed on the return light transmitted by the optical fiber. Therefore, the optical fiber detection unit 31 is able to detect the vibration that has occurred in the fence 10 and in the vicinity thereof based on the received return light. Further, the optical fiber detection unit 31 is able to detect, based on the time from when the pulsed light is input to the optical fiber to when the return light on which the vibration is superimposed is received, the location where this vibration has occurred (the distance from the optical fiber detection unit 31).

For example, the optical fiber detection unit 31 detects the received return light by a distributed vibration sensor, whereby the optical fiber detection unit 31 is able to detect the vibration that has occurred in the fence 10 and in the vicinity thereof and the location where this vibration has occurred, and to acquire vibration data of the vibration that has occurred in the fence 10 and in the vicinity thereof. For example, FIG. 2 shows an example of the vibration data of the vibration that has occurred in the fence 10 and in the vicinity thereof, in which the horizontal axis indicates the location (distance from the optical fiber detection unit 31) and the vertical axis indicates the passage of time. In the example shown in FIG. 2, the vibration occurs in a position that is located about 400 m away from the optical fiber detection unit 31.

Now, the vibration data of the vibration that has occurred in the fence 10 and in the vicinity thereof detected by the optical fiber detection unit 31 has its unique pattern in which the transition of fluctuation in the strength of the vibration, the location of the vibration, the number of vibrations and the like differs from one another depending on the states of the targets to be monitored who are in the fence 10 and in the vicinity thereof.

Therefore, the state detection unit 32 is able to specify the actions taken by the targets to be monitored who are in the fence 10 and in the vicinity thereof by analyzing the dynamic change of the unique pattern that the vibration data has. The persons who are in the fence 10 and in the vicinity thereof may take, for example, the following actions.

(1) grab and shake the fence 10
(2) hit the fence 10
(3) climb the fence 10
(4) set up a ladder against the fence 10 and climb up the ladder
(5) hang around the fence 10
(6) dig a hole near the fence 10
(7) fire a gun near the fence 10
(8) put something near the fence 10

For example, the vibration data indicating that the target to be monitored moves while hitting the fence 10 and eventually digs a hole in the vicinity of the fence 10 is as shown in FIGS. 3A, 3B, 3C, 3D and 3E. The vibration data shown in FIGS. 3A, 3B, 3C, 3D and 3E is vibration data similar to the vibration data shown in FIG. 2 arranged vertically in time series.

Further, a sound and the temperature generated in the fence 10 and in the vicinity thereof are also superimposed on the return light transmitted by the optical fiber. Therefore, the optical fiber detection unit 31 is able to detect the sound and the temperature generated in the fence 10 and in the vicinity thereof as well based on the received return light.

The optical fiber detection unit 31 detects, for example, the received return light by a distributed acoustic sensor and a distributed temperature sensor, whereby the optical fiber detection unit 31 is able to detect the sound and the temperature occurred in the fence 10 and in the vicinity thereof and acquire acoustic data and temperature data of the sound and the temperature occurred in the fence 10 and in the vicinity thereof. In addition thereto, the optical fiber detection unit 31 is able to detect distortion/stress occurred in the fence 10 and in the vicinity thereof and acquire distortion/stress data.

Figure 4:
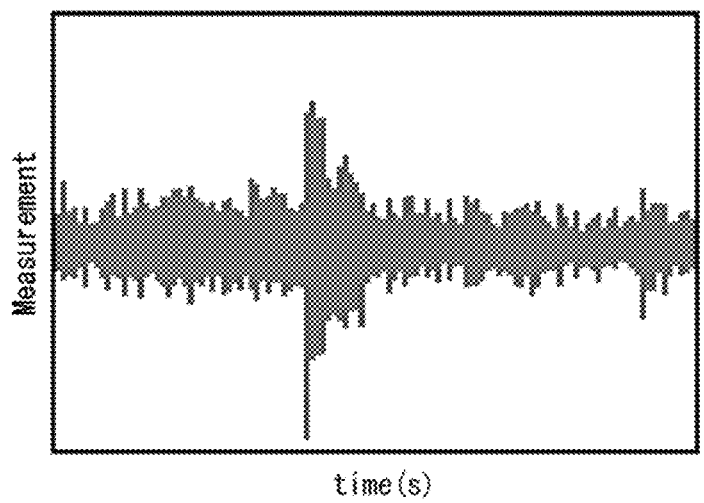
FIG. 4 is a diagram showing an example of acoustic data acquired by the optical fiber detection unit according to the first embodiment.

Now, the aforementioned acoustic data, temperature data, and distortion/stress data also have its unique patterns depending on the states of the targets to be monitored who are in the fence 10 and in the vicinity thereof. For example, FIG. 4 shows an example of the acoustic data of the sound that has occurred in a specific location in the fence 10 and in the vicinity thereof, in which the horizontal axis indicates time and the vertical axis indicates the strength of the sound. In the example shown in FIG. 4, a large sound due to an action taken by the target to be monitored (in this example, a gunfire, as will be described later) in a specific location in the fence 10 and in the vicinity thereof is instantaneously generated.

In the first embodiment, the state detection unit 32 links a plurality of parameters such as the vibration, the sound, the temperature, and the distortion/stress that have occurred in the fence 10 and in the vicinity thereof, and detects the states of the targets to be monitored who are in the fence 10 and in the vicinity thereof.

In the following description, an example in which the state detection unit 32 links the vibration and the sound that have occurred in the fence 10 and in the vicinity thereof and detects the states of the targets to be monitored who are in the fence 10 and in the vicinity thereof will be explained.

The state detection unit 32 first acquires the vibration data of the vibration that has occurred in the fence 10 and in the vicinity thereof from the optical fiber detection unit 31 as a first parameter, and determines whether a predetermined event has occurred in the fence 10 and in the vicinity thereof based on the pattern that the acquired vibration data has.

The predetermined event may be, for example, that the targets to be monitored who are in the fence 10 and in the vicinity thereof have taken one of the aforementioned actions (1)-(8). In this case, a method of detecting the predetermined event by the state detection unit 32 based on the pattern that the vibration data has may be a method of using pattern matching.

The example of using the pattern matching is, for example, as follows. That is, the state detection unit 32 learns, in advance, unique patterns of the vibration data of a vibration that has occurred when a person has taken one of the actions stated in the aforementioned (1) to (8) in the fence 10 and in the vicinity thereof. While machine learning may be performed as the learning method, it is not limited thereto. Then the state detection unit 32 performs pattern matching of the pattern that the vibration data acquired from the optical fiber detection unit 31 has and the pattern that the vibration data that has been learned in advance has, to thereby determine whether a predetermined event has occurred.

Further, the predetermined event may be generation of a large sound. In this case, the state detection unit 32 may detect that a large sound has been generated as a predetermined event when a vibration intensity equal to or larger than a threshold has been detected.

When it is detected that a predetermined event has occurred based on the pattern that the vibration data has, the state detection unit 32 specifies the location where the predetermined event has occurred, acquires location information of the specified location, acquires acoustic data associated with the acquired location information as a second parameter, and detects the state of the target to be monitored using the acquired acoustic data. However, the location where the predetermined event has occurred may not be necessarily specified. This is because the specification of the location where the predetermined event has occurred is not necessary when, for example, the optical fiber cable 20 is laid down in a relatively narrow area or when it is sufficient that a temporal range of the acoustic data be specified by the detection of the predetermined event.

In this case, the state detection unit 32 may change the sampling length of the data before and after the vibration data is switched to the acoustic data. For example, in this example, since the acoustic data is used for the state detection, it may be possible to increase the sampling length of the acoustic data more than the sampling length of the vibration data.

Further, the following two patterns may be possible as the pattern of switching from the vibration data to the acoustic data in the state detection unit 32.

Figure 5:
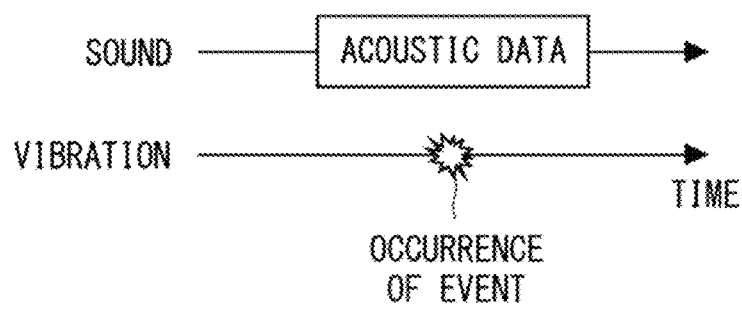
FIG. 5 is a diagram showing an example of a pattern of switching from the vibration data to the acoustic data in the state detection unit according to the first embodiment.

First Pattern (Post Analysis):

As shown in FIG. 5, the state detection unit 32 acquires, from the optical fiber detection unit 31, the acoustic data itself in each location in the optical fiber sensing area where optical fiber sensing is performed and stores the acquired acoustic data. When it is detected that a predetermined event has occurred based on the pattern that the vibration data has, the state detection unit 32 specifies the location where the predetermined event has occurred, acquires location information of the specified location, reads out acoustic data associated with the acquired location information, the acoustic data being data before and after the time when the predetermined event has occurred, and detects the state of the target to be monitored based on the pattern that the acoustic data that has been read out has.

Figure 6:
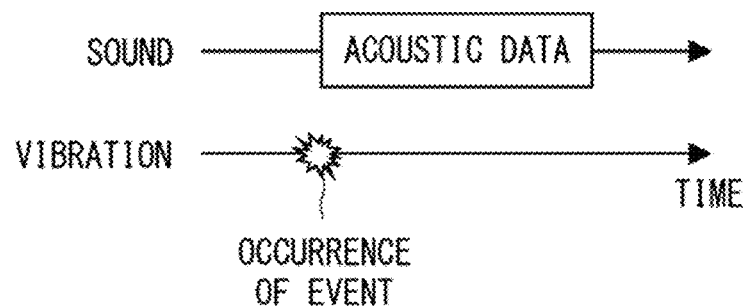
FIG. 6 is a diagram showing another example of the pattern of switching from the vibration data to the acoustic data in the state detection unit according to the first embodiment.

Second Pattern (Real-Time Analysis):

As shown in FIG. 6, when it is detected that a predetermined event has occurred based on the pattern that the vibration data has, the state detection unit 32 specifies the location where the predetermined event has occurred, acquires location information of the specified location, then acquires the acoustic data associated with the acquired location information from the optical fiber detection unit 31, and detects the state of the target to be monitored based on the pattern that the acquired acoustic data has.

Now, the following two methods may be possible as a method of detecting the state of the target to be monitored in the state detection unit 32 based on the pattern that the acoustic data has.

Figure 7:
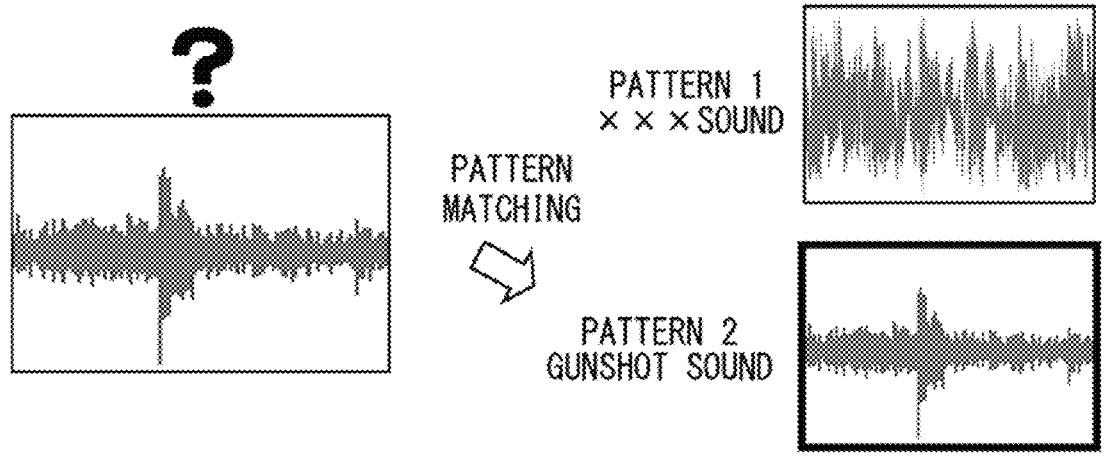
FIG. 7 is a diagram showing an example of a method of detecting the state of a target to be monitored using the acoustic data in the state detection unit according to the first embodiment.

First Method:

The state detection unit 32 learns, in advance, a unique pattern that the acoustic data of a dangerous sound that warns of a danger (e.g., a gunshot sound, a rupture sound, an impact sound, or screaming) has. Then, as shown in FIG. 7, the state detection unit 32 performs pattern matching between the pattern that the acoustic data generated in the location where the predetermined event has occurred acquired from the optical fiber detection unit 31 has, and the pattern that the acoustic data of the dangerous sound learned in advance, and determines whether a dangerous sound has been generated in the location where the predetermined event has occurred. In the example shown in FIG. 7, the results of the pattern matching show that the pattern of the acoustic data generated in the location where the predetermined event has occurred substantially matches the acoustic data of the gunshot sound. Therefore, the state detection unit 32 detects that the target to be monitored has fired a gun. Therefore, according to this method, it is possible to detect the action taken by the target to be monitored when a large vibration due to an action taken by the target to be monitored has been detected as a predetermined event.

Second Method:

The state detection unit 32 detects the content of a conversation made by the target to be monitored by voice recognition as the state of the target to be monitored based on the pattern that the acoustic data generated in the location where the predetermined event has occurred has. Therefore, according to this method, when, for example, a suspicious behavior by the target to be monitored such as digging a hole in the vicinity of the fence 10 has been detected as a predetermined event, it is possible to pick up the following conversation made by the target to be monitored.

While the example in which the vibration data is used as the first parameter for detecting the predetermined event and the acoustic data is used as the second parameter for detecting the state of the target to be monitored has been described in the aforementioned example, the first parameter and the second parameter are not limited to this example.

For example, in contrast to the aforementioned example, the acoustic data may be used as the first parameter and the vibration data may be used as the second parameter. In this case, for example, when the state detection unit 32 has detected occurrence of screaming as the predetermined event based on the pattern that the acoustic data, which is the first parameter, has, the state detection unit 32 may then detect the action taken by the target to be monitored and track the target to be monitored based on the pattern that the vibration data, which is the second parameter, has. Further, when the state detection unit 32 has detected a predetermined content of the conversation (e.g., an NG word) made by the target to be monitored based on the pattern that the acoustic data, which is the first parameter, has, the state detection unit 32 may then detect the action taken by the target to be monitored and track the target to be monitored based on the pattern that the vibration data, which is the second parameter, has.

Further, the state detection unit 32 may not necessarily use the vibration data and the acoustic data as the first parameter and the second parameter, and may use temperature data and distortion/stress data. In this case, the state detection unit 32 may use different types of data (vibration, sound, temperature etc.) as the first parameter and the second parameter.

Further, instead of using different types of data, the state detection unit 32 may use the sampling length of the same type of data as the first parameter and the second parameter. For example, after a predetermined event has been detected based on the pattern that the vibration data of one sampling length has, the state detection unit 32 may detect the state of the target to be monitored based on the pattern that the vibration data of a sampling length larger than the above sampling length has.

Further, the state detection unit 32 may use, as the first parameter and the second parameter, different types of data with different sampling areas, or the same type of data with different sampling areas.

In the following description, with reference to FIGS. 8 and 9, an example in which the state detection unit 32 uses data with different sampling areas as the first parameter and the second parameter will be explained. In this example, an example in which the data sampling area is narrowed down from a wide area to a narrow area will be explained.

Figure 8:
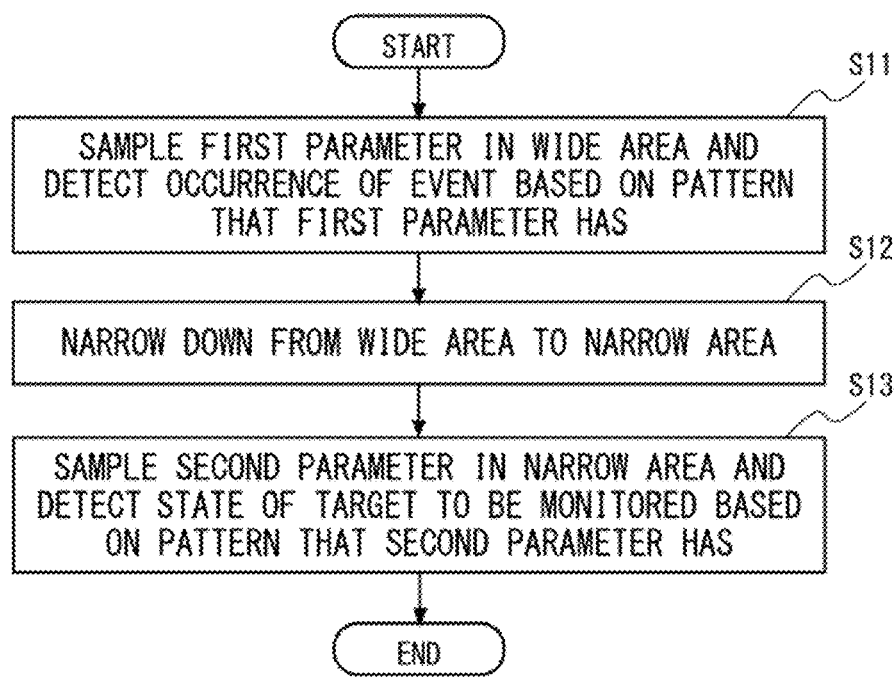
FIG. 8 is a diagram showing an example of an operation flow in a case in which an area to be sensed is narrowed down in the state detection unit according to the first embodiment.

As shown in FIG. 8, the state detection unit 32 first samples and acquires the first parameter in a wide area, and detects a predetermined event based on the pattern that the acquired first parameter has (Step S11).

Next, the state detection unit 32 specifies the location where the predetermined event has occurred and narrows down the data sampling area to a narrow area in the vicinity of the specified location (Step S12).

After that, the state detection unit 32 samples and acquires the second parameter in the aforementioned narrow area that has been narrowed down, and detects the state of the target to be monitored based on the pattern that the acquired second parameter has (Step S13).

When the area is narrowed down in Step S12, as shown in FIG. 9, for example, it may be possible that the state detection unit 32 narrows down the area from a wide area A1 to a narrow area A2 in the vicinity of the location where the predetermined event has occurred.

For example, a large volume of acoustic data and processing thereof may be required to analyze a sound in detail. In this case, processing of the acoustic data is performed comprehensively first in a wide area and in a simple way, and then the acoustic data is analyzed in detail while narrowing down the area, whereby it is possible to obtain an effect of reducing the load of the data processing and to increase efficiency of the whole system.

In the following description, with reference to FIG. 10, a hardware configuration of a computer 60 implementing the state detection apparatus 30 will be explained.

Figure 10:
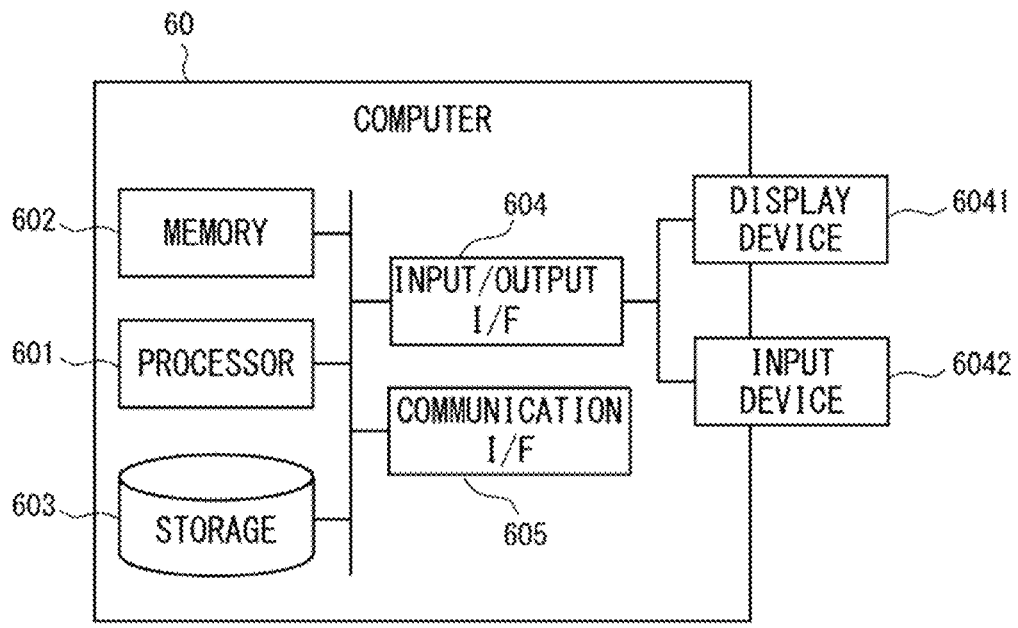
FIG. 10 is a block diagram showing an example of a hardware configuration of a computer that implements a state detection apparatus according to the first embodiment.

As shown in FIG. 10, the computer 60 includes a processor 601, a memory 602, a storage 603, an input/output interface (input/output I/F) 604, a communication interface (communication I/F) 605 and the like. The processor 601, the memory 602, the storage 603, the input/output interface 604, and the communication interface 605 are connected by a data transmission path for transmitting and receiving data between them.

The processor 601 is, for example, an operation processing apparatus such as a Central Processing Unit (CPU) or a Graphics Processing Unit (GPU). The memory 602 is, for example, a memory such as a Random Access Memory (RAM) or a Read Only Memory (ROM). The storage 603 is a storage device such as a Hard Disk Drive (HDD), a Solid State Drive (SSD), or a memory card. Further the storage 603 may be a memory such as a RAM or a ROM.

The storage 603 stores programs for achieving functions of the optical fiber detection unit 31 and the state detection unit 32 included in the state detection apparatus 30. The processor 601 executes these programs, thereby achieving the functions of the optical fiber detection unit 31 and the state detection unit 32. When executing these programs, the processor 601 may load these programs on the memory 602 and then execute these loaded programs or may execute these programs without loading them on the memory 602. Further, the memory 602 and the storage 603 also serve to store information and data held in the optical fiber detection unit 31 and the state detection unit 32.

Further, the program(s) can be stored and provided to a computer (including the computer 60) using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc-ROM (CD-ROM), CD-Recordable (CD-R), CD-ReWritable (CD-R/W), and semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The input/output interface 604 is connected to a display device 6041, an input device 6042 or the like. The display device 6041 is a device that displays a screen that corresponds to drawing data processed by the processor 601 such as a Liquid Crystal Display (LCD) or a Cathode Ray Tube (CRT) display. The input device 6042, which is a device that receives an operation input by an operator, is, for example, a keyboard, a mouse, and a touch sensor. The display device 6041 and the input device 6042 may be integrated and may be provided as a touch panel. The computer 60, which may include a sensor (not shown) such as a distributed vibration sensor, may include a configuration in which this sensor is connected to the input/output interface 604.

The communication interface 605 transmits and receives data to and from an external apparatus. The communication interface 605 communicates, for example, with an external apparatus via a wired communication path or a wireless communication path.

<Operations of First Embodiment>

In the following description, with reference to FIG. 11, an operation flow of the optical fiber sensing system according to the first embodiment will be explained.

Figure 11:
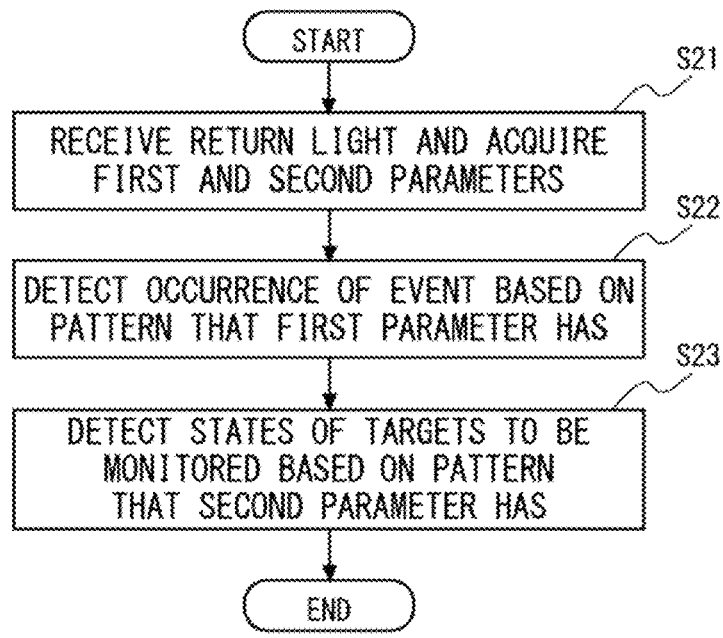
FIG. 11 is a flowchart showing an example of an operation flow of the optical fiber sensing system according to the first embodiment.

As shown in FIG. 11, first, the optical fiber detection unit 31 emits the pulsed light to at least one optical fiber included in the optical fiber cable 20, receives the return light from the optical fiber the same as the optical fiber to which the pulsed light has been emitted, and acquires the first parameter (e.g., vibration data) and the second parameter (e.g., the acoustic data) having a pattern in accordance with the states of the targets to be monitored who are in the fence 10 and in the vicinity thereof based on the received return light (Step S21).

Next, the state detection unit 32 detects the predetermined event that has occurred in the fence 10 and in the vicinity thereof based on the pattern that the first parameter has (Step S22).

After that, the state detection unit 32 detects the states of the targets to be monitored who are in the fence 10 and in the vicinity thereof based on the pattern that the second parameter has (Step S23).

<Effects of First Embodiment>

As described above, according to the first embodiment, the state detection apparatus 30 acquires the first parameter and the second parameter having a pattern in accordance with the states of the targets to be monitored who are in the fence 10 and in the vicinity thereof based on the return light (optical signal) received from at least one optical fiber included in the optical fiber cable 20, detects the predetermined event that has occurred in the fence 10 and in the vicinity thereof based on the pattern that the first parameter has, and then detects the states of the targets to be monitored who are in the fence 10 and in the vicinity thereof based on the pattern that the second parameter has. In this way, since the state of the target to be monitored is detected by linking the parameters different from one another, the state of the target to be monitored can be detected at a higher level and in a more flexible way.

Further, as described above, according to the first embodiment, the state detection apparatus 30 detects the states of the targets to be monitored who are in the fence 10 and in the vicinity thereof based on the pattern that the second parameter has. That is, instead of detecting the state based on a rough reference such as whether the magnitude of a vibration is large or small, as disclosed in Cited Literature 1, for example, (e.g., the state is specified from results that the vibration is large and the number of vibrations is large), the state detection apparatus 30 dynamically analyzes the pattern of the change in the second parameter (e.g., transition of a change in the magnitude of the vibration), thereby detecting the state of the target to be monitored. It is therefore possible to detect the state of the target to be monitored with a high accuracy.

Further, according to the first embodiment, the optical fiber sensing technology that uses the optical fibers as sensors is used. Therefore, it is possible to obtain advantages that there is no influence of electromagnetic noise, power feeding to the sensors becomes unnecessary, environmental tolerance is high, and a maintenance operation can be easily performed.

Second Embodiment

<Configuration of Second Embodiment>

Figure 12:
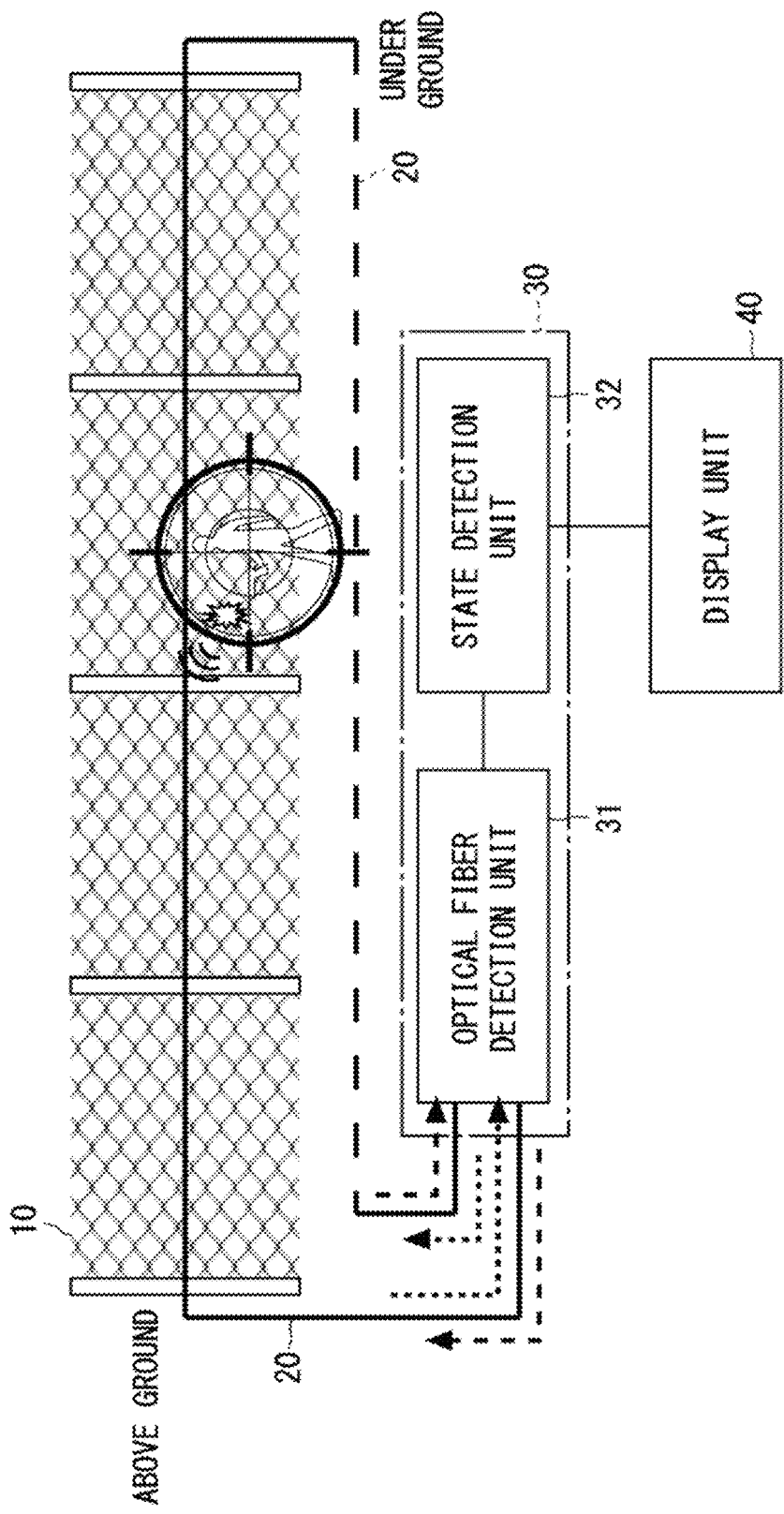
FIG. 12 is a diagram showing a configuration example of an optical fiber sensing system according to a second embodiment.

Referring first to FIG. 12, a configuration of an optical fiber sensing system according to a second embodiment will be explained. While the description will be made assuming that the targets to be monitored are persons who are in the fence 10 and in the vicinity thereof in this second embodiment, like in the aforementioned first embodiment, the target to be monitored is not limited thereto.

As shown in FIG. 12, the optical fiber sensing system according to the second embodiment further includes, besides the components according to the first embodiment, a display unit 40.

The display unit 40, which displays the results of the detection performed by the state detection unit 32, is installed in a monitoring room or the like that monitors the fence 10 and a part in the vicinity thereof. The display unit 40 is connected to, for example, the input/output interface 604 of the computer 60 (a computer that implements the state detection apparatus 30) shown in FIG. 10 as the display device 6041 shown in FIG. 10.

Figure 13:
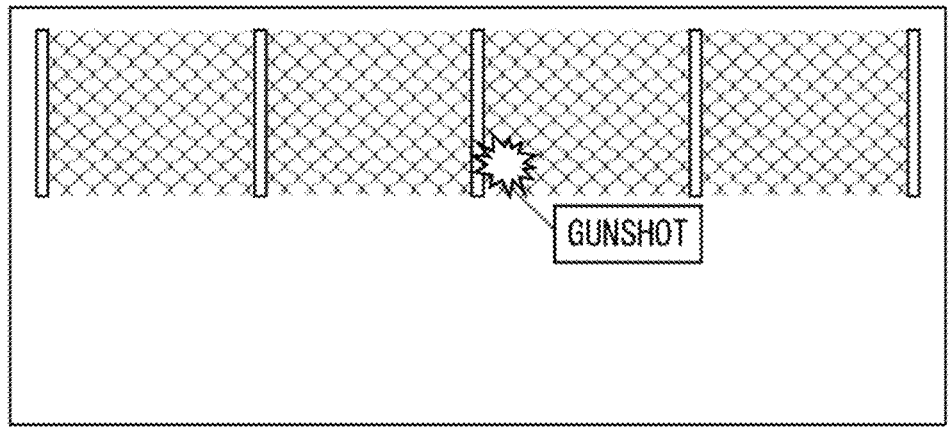
FIG. 13 is a diagram showing a display example of results of detecting the state of a target to be monitored by a display unit according to the second embodiment.

The display unit 40 may display the location where a predetermined event has occurred and the results of detecting the state of the target to be monitored who is in the location where the event has occurred. For example, the example shown in FIG. 13 is a display example in a case in which a predetermined event has been detected using the vibration data, which is the first parameter, and then it is detected that a gun has been fired using the acoustic data, which is the second parameter. Note that the mark shown in FIG. 13 indicates the location where the predetermined event has occurred. Further, the display unit 40 may display the location where the predetermined event has occurred and the results of detecting the state of the target to be monitored at the same display timing or they may be displayed at timings different from each other. The display unit 40 may first display, for example, the location where the predetermined event has occurred and then display the results of detecting the state of the target to be monitored.

Figure 14:
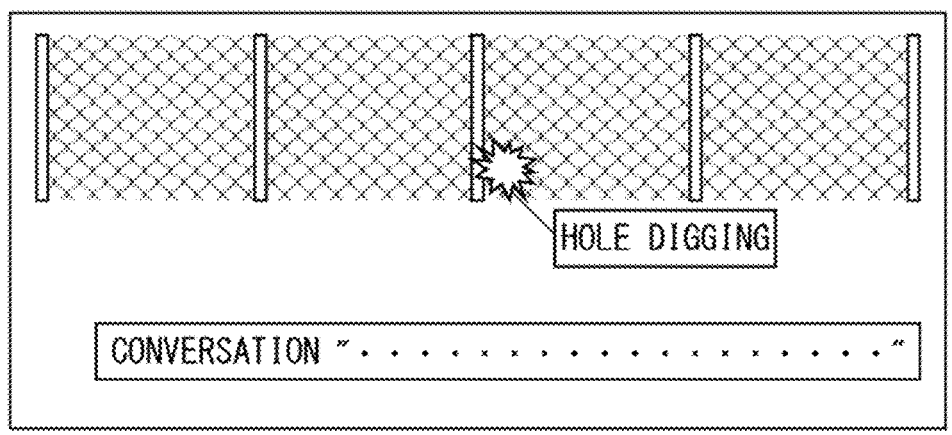
FIG. 14 is a diagram showing another display example of results of detecting the state of the target to be monitored by the display unit according to the second embodiment.

Further, the display unit 40 may display the location where the predetermined event has occurred and the content of this event and the results of detecting the state of the target to be monitored who is in the location where the event has occurred. For example, the example shown in FIG. 14 is a display example in a case in which it is detected that the target to be monitored is digging a hole in the vicinity of the fence 10 as a predetermined event using the vibration data as the first parameter and then the content of the following conversation made by the target to be monitored is detected using the acoustic data as the second parameter. In FIG. 14, the display unit 40 may display a reproduction button of the content of the conversation. In this case, the state detection unit 32 may record the content of the conversation made by the target to be monitored, and after the reproduction button is, for example, clicked, the state detection unit 32 may reproduce the content of the conversation that has been recorded. Further, the display unit 40 may display the location where the predetermined event has occurred and the content of this event and the results of detecting the state of the target to be monitored at the same display timing or may display them at timings different from each other. The display unit 40 may first display, for example, the location where the predetermined event has occurred and the content of this event and then display the results of detecting the state of the target to be monitored.

Further, the display unit 40 may display countermeasures in accordance with the results of detecting the state of the target to be monitored (e.g., dispatch of a security guard, dispatch of rescue workers, or report to a predetermined destination). For example, a desired component of the state detection apparatus 30 may hold a table in which the state of the target to be monitored is associated with the countermeasure in accordance with the state, and the display unit 40 may display the countermeasure based on this table.

<Operations of Second Embodiment>

Hereinafter, with reference to FIG. 15, an operation flow of the optical fiber sensing system according to this second embodiment will be explained.

Figure 15:
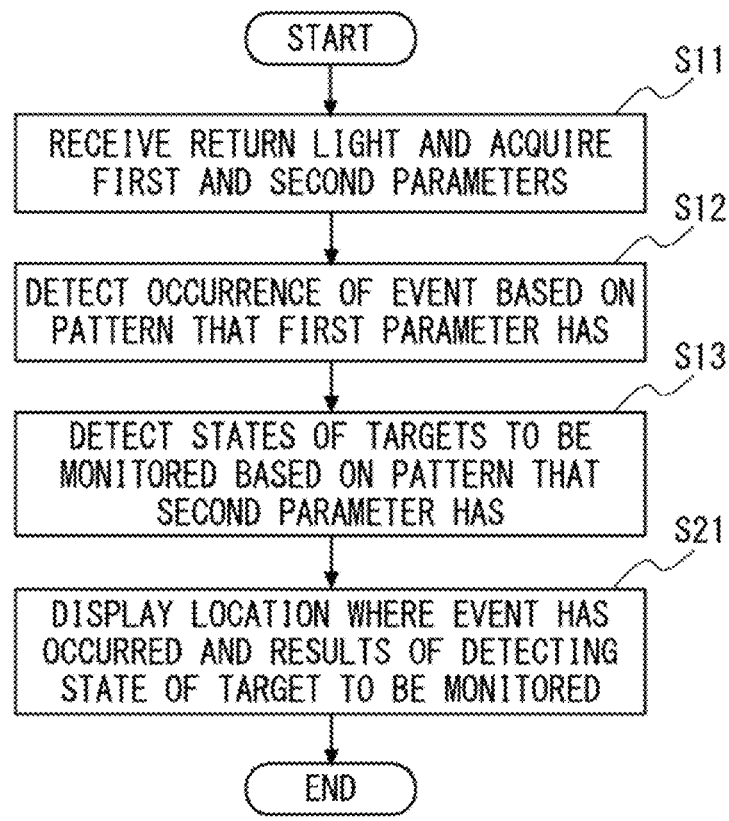
FIG. 15 is a flowchart showing an example of an operation flow of the optical fiber sensing system according to the second embodiment.

As shown in FIG. 15, first, processing of Steps S11-S13 described with reference to FIG. 11 in the aforementioned first embodiment is performed.

After that, the display unit 40 displays the results of detecting the states of the targets to be monitored who are in the fence 10 and in the vicinity thereof detected by the state detection unit 32 (Step S13). In this case, as described above, the display unit 40 may further display the location where the predetermined event has occurred and the content of this event, the countermeasure in accordance with the results of detecting the state of the target to be monitored, a reproduction button and the like.

<Effects of Second Embodiment>

As described above, according to this second embodiment, the display unit 40 displays the results of detecting the states of the targets to be monitored who are in the fence 10 and in the vicinity thereof detected by the state detection unit 32. Therefore, a monitoring person or the like who is in a monitoring room or the like is able to visually and efficiently determine the state of the target to be monitored based on the content displayed on the display unit 40 and to take a prompt action when dispatch of a security guard or the like is needed.

Third Embodiment

In a third embodiment, an example in which a combination of the parameters in the aforementioned first embodiment is modified will be explained. Further, the target to be monitored according to the third embodiment may be applied not only to the persons who are in the fence 10 and in the vicinity thereof but also to persons who are in other places. The configuration of the third embodiment is similar to that of the aforementioned first embodiment except that the location where the optical fiber cable 20 is laid down is not limited to the fence 10 and the vicinity thereof.

In the following description, examples of combinations of the parameters used in the state detection unit 32 will be explained.

First Example

This example is an example in which the state detection unit 32 detects the predetermined event that has occurred in the vicinity of the target to be monitored based on the pattern that the first parameter has, and then detects the state of the target to be monitored based on the pattern that the second parameter has and detects the state of the target to be monitored based on the pattern that the first parameter has.

For example, the state detection unit 32 detects the predetermined event that has occurred in the vicinity of the target to be monitored based on the pattern that the vibration data, which is the first parameter, has, then detects the state of the target to be monitored based on the pattern that the acoustic data, which is the second parameter, has and detects the state of the target to be monitored based on the pattern that the vibration data, which is the first parameter, has. Accordingly, even when the target to be monitored has moved after the predetermined event has been detected, it becomes possible to detect the action taken by the target to be monitored and to track the target to be monitored based on the pattern that the vibration data, which is the first parameter, has. Further, the location regarding which the acoustic analysis is to be performed may be made to follow a change in the position of the target to be monitored. When the location of the acoustic analysis can be moved in accordance with the movement in the target to be monitored, the state of the target to be monitored (conversations etc.) can be acquired from a sound as well.

Second Example

This example is an example in which, the state detection unit 32 detects the predetermined event that has occurred in the vicinity of the target to be monitored based on the pattern that the first parameter has, and then detects the state of the target to be monitored based on the pattern that the second parameter has, and when a specific state of the target to be monitored has been detected, the state detection unit 32 then detects the state of the target to be monitored based on the pattern that the first parameter has.

For example, the state detection unit 32 detects the predetermined event that has occurred in the vicinity of the target to be monitored based on the pattern that the vibration data, which is the first parameter, has, and then detects the state of the target to be monitored based on the pattern that the acoustic data, which is the second parameter, has. As a result, when a specific state of the target to be monitored (e.g., a state in which the target acts very suspiciously by, for example, firing a gun, so that an urgent action is required) has been detected, the state detection unit 32 then detects the state of the target to be monitored based on the pattern that the vibration data, which is the first parameter, has. Accordingly, even when the target to be monitored who has been in a specific state such as acting very suspiciously has moved, it becomes possible to detect the action taken by the target to be monitored and track the target to be monitored based on the pattern that the vibration data, which is the first parameter, has.

Figure 16:
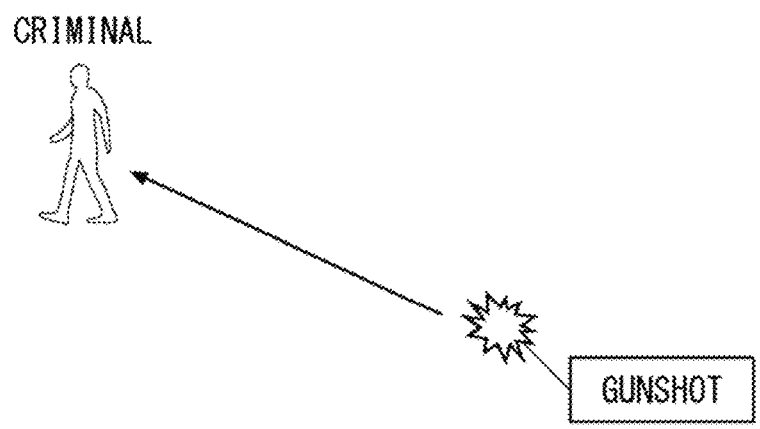
FIG. 16 is a diagram showing an example of a method of detecting the state of a target to be monitored using vibration data in a state detection unit according to a third embodiment.

As a more specific example, as shown in FIG. 16, for example, it is assumed that after a predetermined event has been detected, the state detection unit 32 has detected that the target to be monitored (criminal) has fired a gun based on the pattern that the acoustic data, which is the second parameter, has. In this case, the state detection unit 32 then tracks the target to be monitored (criminal) who has fired a gun based on the pattern that the vibration data, which is the first parameter, has.

Figure 17:
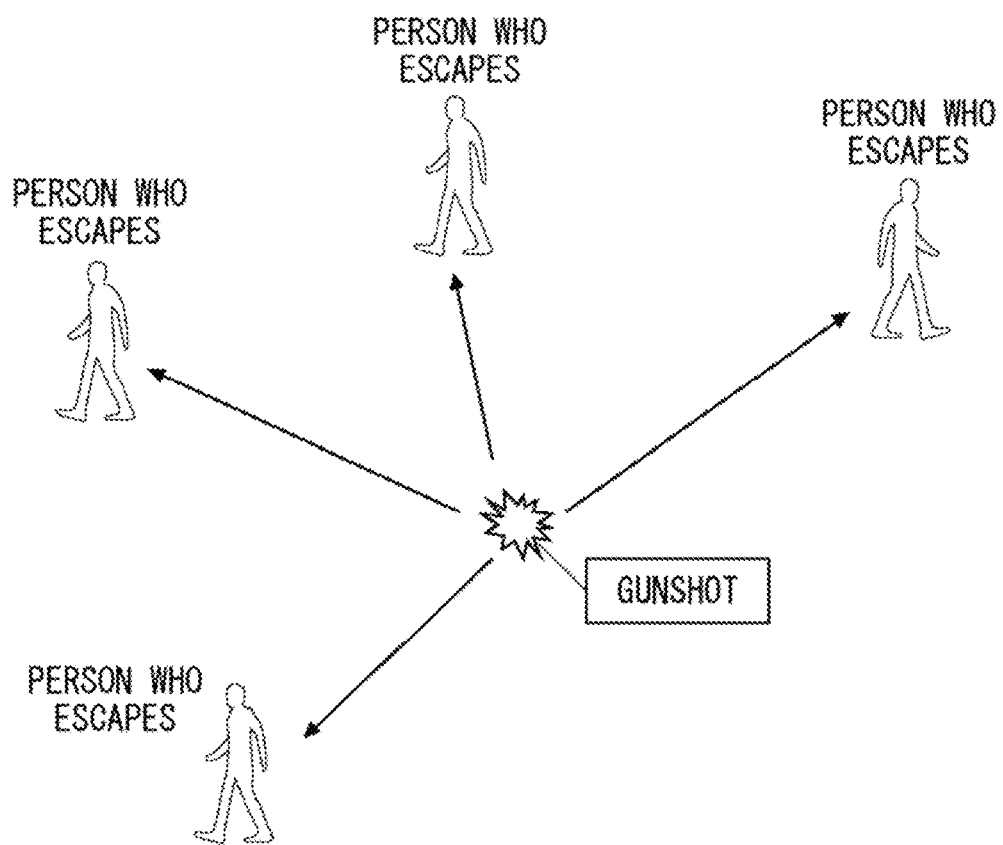
FIG. 17 is a diagram showing an example of the method of detecting the state of the target to be monitored using the vibration data in the state detection unit according to the third embodiment.

Further, as shown in FIG. 17, it is assumed that, after a predetermined event has been detected, the state detection unit 32 detects that the target to be monitored (criminal) has fired a gun based on the pattern that the acoustic data, which is the second parameter, has. In this case, the state detection unit 32 then tracks a person who escapes from the location where the predetermined event has occurred as the target to be monitored based on the pattern that the vibration data, which is the first parameter, has. Further, in this case, the state detection unit 32 is able to estimate the location of the criminal who has fired a gun based on the direction in which the target to be monitored (person who escapes) escapes. Since a plurality of persons escape in a radial pattern in the example shown in FIG. 17, it can be estimated that there is a criminal in the central position thereof.

Further, this example can be applied to a facility such as an airport where there are a large number of people. For example, after the state detection unit 32 detects a predetermined event that people are gathering based on the pattern that the vibration data, which is the first parameter, has, the state detection unit 32 detects conversations of people who are gathering based on the pattern that the acoustic data, which is the second parameter, has. Then the state detection unit 32 determines the target to be monitored according to the content of the conversation (e.g., determine a person who has uttered an NG word to be the target to be monitored), and after that tracks the determined target to be monitored based on the pattern that the vibration data, which is the first parameter, has.

As described above, according to the third embodiment, the state detection apparatus 30 detects, after the predetermined event has been detected, the state of the target to be monitored based on the pattern that the second parameter has, and detects the state of the target to be monitored based on the pattern that the first parameter has. Alternatively, the state detection apparatus 30 detects, after the predetermined event has been detected, the state of the target to be monitored based on the pattern that the second parameter has. When a specific state of the target to be monitored has been detected, the state detection apparatus 30 then detects the state of the target to be monitored based on the pattern that the first parameter has. Therefore, it becomes possible to detect, for example, occurrence of a predetermined event nearby and to then track the target to be monitored based on the pattern that the vibration data, which is the first parameter, has. It becomes also possible to track, based on the pattern that the vibration data, which is the first parameter, has, the target to be monitored whose specific state has been detected based on the pattern that the acoustic data, which is the second parameter, has.

While the present disclosure has been described with reference to the embodiments, the present disclosure is not limited to the aforementioned embodiments. Various changes that can be understood by those skilled in the art can be made to the configurations and the details of the present disclosure within the scope of the present disclosure.

For example, while the example in which the targets to be monitored are persons who are in the fence and a place in the vicinity of the fence has been described in the aforementioned embodiments, the target to be monitored is not limited thereto. The target to be monitored may be a person who is on a wall, a floor, a pipeline, a utility pole, a civil engineering structure, a road, a railroad, and a place in the vicinity thereof, not a person who is in the fence. Further, the fence, the wall and the like may be installed in a commercial facility, an airport, a border, a hospital, a city, a port, a plant, a nursing care facility, an office building, a nursery center, or at home. Further, the target to be monitored may be an animal, an automobile or the like, not a person.

A part or all of the aforementioned embodiments may be described as shown in the following Supplementary Notes. However, they are not limited thereto.

(Supplementary Note 1)

An optical fiber sensing system comprising:

a cable including optical fibers;

a reception unit configured to receive an optical signal from at least one optical fiber included in the cable and acquire a first parameter and a second parameter having a pattern in accordance with a state of a target to be monitored based on the optical signal; and a state detection unit configured to detect a predetermined event based on the pattern that the first parameter has and then detect the state of the target to be monitored based on the pattern that the second parameter has.

(Supplementary Note 2)

The optical fiber sensing system according to Supplementary Note 1, wherein the state detection unit detects, after the predetermined event has been detected, the state of the target to be monitored based on the pattern that the second parameter has, and detects the state of the target to be monitored based on the pattern that the first parameter has.

(Supplementary Note 3)

The optical fiber sensing system according to Supplementary Note 1, wherein the state detection unit detects the state of the target to be monitored based on the pattern that the second parameter has after the predetermined event has been detected, and when a specific state of the target to be monitored has been detected, the state detection unit then further detects the state of the target to be monitored based on the pattern that the first parameter has.

(Supplementary Note 4)

The optical fiber sensing system according to any one of Supplementary Notes 1 to 3, wherein
the first parameter is vibration data,
the second parameter is acoustic data,
the state detection unit detects the predetermined event and specifies the location where the predetermined event has occurred based on the pattern that the vibration data, which is the first parameter, has, and
the state detection unit detects the state of the target to be monitored based on the pattern that the acoustic data, which is the second parameter in the location where the predetermined event has occurred, has.

(Supplementary Note 5)

The optical fiber sensing system according to Supplementary Note 4, wherein
the target to be monitored is a person, and
the state detection unit detects a conversation made by the person as a state of the person who is the target to be monitored based on the pattern that the acoustic data, which is the second parameter, has.

(Supplementary Note 6)

The optical fiber sensing system according to any one of Supplementary Notes 1 to 5, wherein
the target to be monitored is a person, and
the state detection unit detects an action taken by the person as a state of the person who is the target to be monitored based on the pattern that the second parameter has.

(Supplementary Note 7)

The optical fiber sensing system according to any one of Supplementary Notes 1 to 6, further comprising a display unit configured to display a result of detecting the state of the target to be monitored detected by the state detection unit.

(Supplementary Note 8)

A state detection apparatus comprising:
a reception unit configured to receive an optical signal from at least one optical fiber included in a cable and acquire a first parameter and a second parameter having a pattern in accordance with a state of a target to be monitored based on the optical signal; and
a state detection unit configured to detect a predetermined event based on the pattern that the first parameter has and then detect the state of the target to be monitored based on the pattern that the second parameter has.

(Supplementary Note 9)

The state detection apparatus according to Supplementary Note 8, wherein the state detection unit detects, after the predetermined event has been detected, the state of the target to be monitored based on the pattern that the second parameter has, and detects the state of the target to be monitored based on the pattern that the first parameter has.

(Supplementary Note 10)

The state detection apparatus according to Supplementary Note 8, wherein the state detection unit detects the state of the target to be monitored based on the pattern that the second parameter has after the predetermined event has been detected, and when a specific state of the target to be monitored has been detected, the state detection unit then further detects the state of the target to be monitored based on the pattern that the first parameter has.

(Supplementary Note 11)

The state detection apparatus according to any one of Supplementary Notes 8 to 10, wherein
the first parameter is vibration data,
the second parameter is acoustic data,
the state detection unit detects the predetermined event and specifies the location where the predetermined event has occurred based on the pattern that the vibration data, which is the first parameter, has, and
the state detection unit detects the state of the target to be monitored based on the pattern that the acoustic data, which is the second parameter in the location where the predetermined event has occurred, has.

(Supplementary Note 12)

The state detection apparatus according to Supplementary Note 11, wherein
the target to be monitored is a person, and
the state detection unit detects a conversation made by the person as a state of the person who is the target to be monitored based on the pattern that the acoustic data, which is the second parameter, has.

(Supplementary Note 13)

The state detection apparatus according to any one of Supplementary Notes 8 to 12, wherein
the target to be monitored is a person, and
the state detection unit detects an action taken by the person as a state of the person who is the target to be monitored based on the pattern that the second parameter has.

(Supplementary Note 14)

A state detection method by a state detection apparatus, the method comprising:
receiving an optical signal from at least one optical fiber included in a cable and acquiring a first parameter and a second parameter having a pattern in accordance with a state of a target to be monitored based on the optical signal; and
detecting a predetermined event based on the pattern that the first parameter has and then detecting the state of the target to be monitored based on the pattern that the second parameter has.

(Supplementary Note 15)

A non-transitory computer readable medium storing a program for causing a computer to execute the following procedures of:
receiving an optical signal from at least one optical fiber included in a cable and acquiring a first parameter and a second parameter having a pattern in accordance with a state of a target to be monitored based on the optical signal; and
detecting a predetermined event based on the pattern that the first parameter has and then detecting the state of the target to be monitored based on the pattern that the second parameter has.

REFERENCE SIGNS LIST

10 Fence
20 Optical Fiber Cable
30 State Detection Apparatus
31 Optical Fiber Detection Unit
32 State Detection Unit
40 Display Unit
60 Computer
601 Processor
602 Memory
603 Storage
604 Input/output Interface
6041 Display Device
6042 Input Device
605 Communication Interface

What is claimed is:

1. An optical fiber sensing system comprising:
a cable including optical fibers;
a reception unit configured to receive an optical signal from at least one optical fiber included in the cable and acquire a first parameter and a second parameter having a pattern in accordance with a state of a target to be monitored based on the optical signal; and
a state detection unit configured to detect a predetermined event based on pattern matching between the pattern that the first parameter has and a first learning pattern learned in advance and then detect the state of the target to be monitored based on pattern matching between the pattern that the second parameter has and a second learning pattern learned in advance.

2. The optical fiber sensing system according to claim 1, wherein:
the first parameter is vibration data,
the second parameter is acoustic data,
the state detection unit detects the predetermined event based on pattern matching between the pattern that the vibration data, which is the first parameter, has and the first learning pattern learned in advance and specifies the location where the predetermined event has occurred based on the pattern that the vibration data, which is the first parameter, has, and
the state detection unit detects the state of the target to be monitored based on a pattern matching between the pattern that the acoustic data, which is the second parameter in the location where the predetermined event has occurred, has and the second learning pattern learned in advance.

3. The optical fiber sensing system according to claim 1, wherein:
the target to be monitored is a person, and
the state detection unit detects an action taken by the person as a state of the person who is the target to be monitored based on pattern matching between the pattern that the second parameter has and the second learning pattern learned in advance.

4. The optical fiber sensing system according to claim 1, further comprising a display unit configured to display a result of detecting the state of the target to be monitored detected by the state detection unit.

5. A state detection apparatus comprising:
a reception unit configured to receive an optical signal from at least one optical fiber included in a cable and acquire a first parameter and a second parameter having a pattern in accordance with a state of a target to be monitored based on the optical signal; and
a state detection unit configured to detect a predetermined event based on pattern matching between the pattern that the first parameter has and a first learning pattern learned in advance and then detect the state of the target to be monitored based on pattern matching between the pattern that the second parameter has and a second learning pattern learned in advance.

6. The state detection apparatus according to claim 5, wherein:
the first parameter is vibration data,
the second parameter is acoustic data,
the state detection unit detects the predetermined event based on pattern matching between the pattern that the vibration data, which is the first parameter, has and the first learning pattern learned in advance and specifies the location where the predetermined event has occurred based on the pattern that the vibration data, which is the first parameter, has, and
the state detection unit detects the state of the target to be monitored based on pattern matching between the pattern that the acoustic data, which is the second parameter in the location where the predetermined event has occurred, has and the second learning pattern learned in advance.

7. The state detection apparatus according to claim 5, wherein:
the target to be monitored is a person, and
the state detection unit detects an action taken by the person as a state of the person who is the target to be monitored based on pattern matching between the pattern that the second parameter has and the second learning pattern learned in advance.

8. A state detection method by a state detection apparatus, the method comprising:
receiving an optical signal from at least one optical fiber included in a cable and acquiring a first parameter and a second parameter having a pattern in accordance with a state of a target to be monitored based on the optical signal; and
detecting a predetermined event based on pattern matching between the pattern that the first parameter has and a first learning pattern learned in advance and then detecting the state of the target to be monitored based on pattern matching between the pattern that the second parameter has and a second learning pattern learned in advance.

* * * * *